US006460675B1

(12) United States Patent
Graton

(10) Patent No.: US 6,460,675 B1
(45) Date of Patent: Oct. 8, 2002

(54) SLIP CLUTCH WITH A LINEAR FRICTION WEAR TAKE-UP DEVICE, ESPECIALLY FOR A MOTOR VEHICLE

(75) Inventor: Michel Graton, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/701,484
(22) PCT Filed: Mar. 28, 2000
(86) PCT No.: PCT/FR00/00772
  § 371 (c)(1),
  (2), (4) Date: Nov. 29, 2000
(87) PCT Pub. No.: WO00/58641
  PCT Pub. Date: Oct. 5, 2000

(30) Foreign Application Priority Data

Mar. 29, 1999 (FR) .......................................... 99 03879

(51) Int. Cl.⁷ .............................................. F16D 13/75
(52) U.S. Cl. ................................ 192/70.25; 192/111 A
(58) Field of Search ........................... 192/70.25, 111 A

(56) References Cited

U.S. PATENT DOCUMENTS 5,845,750 A * 12/1998 Thirion De Briel et al. ..... 192/70.25
6,334,521 B1 * 1/2001 Blard et al. .............. 192/70.25

FOREIGN PATENT DOCUMENTS

FR      2753503       3/1998
WO   WO 00/394474 A1 * 7/2000

* cited by examiner

Primary Examiner—Richard M. Lorence
(74) Attorney, Agent, or Firm—Liniak, Berenato, Longacre & White

(57) ABSTRACT

A slip clutch comprising a reaction plate, a friction disk (100), a pressure plate (11), a cover (12) fixed to the reaction plate, engaging member (13) acting between the cover (12) and the pressure plate (11), a linear wear take-up device comprising devices (14) that are provided with ramps and are adapted to cooperate with members that are provided with counter-ramps (15), teeth (19) that cooperate with an endless screw (23), members provided with ramps that are rotationally fixed to the teeth (19), rotational drive device (20) for the endless screw consisting of a ratchet wheel (20) that is rotationally fixed to the endless screw (23) and controlled by the tongue (36) of an elastic member (32), whereby the endless screw (23) and the ratchet wheel (20) are borne by a support (22), and the support (22) and the elastic member (32) are joined to the cover (12), whereby the support (22) is U-shaped with a web (24) and two wings (25) that are used to bear a shaft (27) on which the endless crew (23) and the ratchet wheel (20) are arranged. The elastic member (32) is fixed (55) to the web (24) of the support in a manner that is independent from the manner in which the support is fixed to the cover.

16 Claims, 4 Drawing Sheets

SLIP CLUTCH WITH A LINEAR FRICTION WEAR TAKE-UP DEVICE, ESPECIALLY FOR A MOTOR VEHICLE

The present invention relates to a friction clutch, in particular for a motor vehicle, and more particularly it relates to a clutch which is equipped with a device for compensating for wear which is due in particular to wear of at least one friction liner, the said device, which is hereinafter called a wear compensating device, operating in response to the wear which takes place in the liner or liners.

A conventional friction clutch generally includes a reaction plate which is part of an engine flywheel, which may be in two parts so as to constitute a damping flywheel or a flexible flywheel, mounted in rotation on a first shaft which is usually a driving shaft, such as the crankshaft of the internal combustion engine, and which supports, through its outer periphery, a cover plate to which at least one pressure plate is attached.

The pressure plate is fixed to the cover plate and reaction plate for rotation with them, while being axially displaceable under the biasing action of axially acting clutch engaging means controlled by declutching means; the clutch engaging means may consist of helical springs or one or two Belleville rings mounted in series or in parallel and subjected to the action of declutching levers which constitute the declutching means; generally the clutch engaging and declutching means are incorporated in a single component, for example a metallic diaphragm which bears on the cover plate; the diaphragm may be mounted in series or in parallel with a Belleville ring to assist the declutching force.

A friction disc, carrying at least one friction liner at its outer periphery, and fixed to a shaft for rotation therewith, the shaft being usually a driven shaft such as the input shaft of the gearbox, is interposed between the pressure plate and reaction plate in such a way as to be gripped between them when the clutch is in its disengaged condition. The clutch engaging means control the axial displacement of the pressure plate when they are actuated by a clutch release bearing through the declutching means.

The friction disc usually comprises a support disc which is elastic in the axial sense, and on either side of which two friction liners are fixed. Gripping of the friction disc is thus progressive. In other versions the support disc is rigid, and is for example encapsulated at its outer periphery within a friction liner.

During the working life of such a clutch, the friction liner or liners and the counteracting elements, that is to say the pressure plate and reaction plate, undergo wear which causes the position of the pressure plate and the positions of the axially acting clutch engaging means and clutch release bearing to vary, from which there follows a variation in the gripping force exerted between the friction disc on the one hand and the pressure and reaction plates on the other, due to the modifications in the working conditions of the clutch engaging means, and the force necessary to effect declutching is thereby affected. By giving such a clutch a wear compensating device, these disadvantages are avoided, with the clutch engaging means and the clutch release bearing, which is usually in constant engagement on the declutching means, occupying the same position when the clutch is in its engaged state, so that the axial size of the clutch is reduced.

It is known to provide, in particular for a motor vehicle, a friction clutch of the kind comprising a reaction plate adapted to be mounted in rotation on a driving shaft, a friction disc carrying at its outer periphery at least one friction liner and adapted to be mounted in rotation on a driven shaft, a pressure plate, a cover plate fixed on the reaction plate, axially acting clutch engaging means which are controlled by declutching means and which work between the cover plate on the one hand and the pressure plate on the other hand, through secondary abutment means and primary abutment means, the pressure plate being fixed in rotation to the cover plate while being displaceable axially with respect to the latter and being subjected to the action of resilient return means urging the pressure plate axially towards the cover plate, the said clutch further including a wear compensating device comprising ramp means, the ramps of which are disposed circumferentially and which is placed axially between the abutment means and the pressure plate and adapted to cooperate with counter-ramp means, a set of teeth with which a worm disposed tangentially is in cooperation, the ramp means being fixed in rotation to the said set of teeth, means being provided for driving the worm in rotation and being operated as a result of wear in the friction liner or liners when the clutch is engaged, the said worm driving means consisting of a ratchet wheel which is fixed in rotation to the worm and being controlled through a control tongue which is part of a resilient member, the worm and the ratchet wheel being carried by a support member, the support member and the resilient member being fixed to the cover plate and being placed inside the latter, the support member being U-shaped with a spine and two wings which are adapted to support a spindle carrying the worm and the ratchet wheel.

A clutch of this kind is for example described in the document FR-A-2 753 503.

Up to the present time in such a clutch, the resilient member is supported by the spindle through two ears of the resilient member, which are formed with holes through which the said spindle passes in the vicinity of the ends of the latter; such an arrangement works well. However, it can be desirable, firstly to simplify the resilient member, and secondly to increase the length of the control tongue so as to reduce the stresses that may affect its useful life expectancy.

An object of the present invention is to respond to these desires in a simple and inexpensive way.

Thus, in accordance with the invention a clutch of the above type is characterised by the fact that the resilient member is fixed to the spine of the support member independently of the fastening of the support member to the cover plate.

Preferably, the resilient member is disposed at least partly in the zone in which it is fixed to the support member, between the spine of the support member and the cover plate.

The length of the control tongue can then be increased and the latter is subjected to less stress. The resilient member is simplified because it does not have wings in contact with the wings of the support member.

Preferably, the resilient member is generally U-shaped in axial cross section and comprises two axially oriented wings, one of which is formed with a hole for fastening it to the support member, for example by riveting or clipping, the other one being configured as a control tongue and extending generally parallel to the axis of the clutch.

In one embodiment, the spine of the support member is extended, beyond the wings, by a transverse flange extending generally at right angles to the spine and wings, while the wing of the resilient member, for fastening the latter to the support member, is extended by a generally perpendicular tongue which extends outwards from the fixed U, and, with the flange of the support member, lies against a transverse flange of the cover plate.

Preferably, the course of travel of the control tongue with respect to the ratchet wheel, during the operation of disengaging the clutch, is limited by a control abutment defined by at least one lug formed by being pressed out in the support member.

Preferably, the edge of the spine of the support member is cut out in the centre as a slot having a width with which the corresponding width of the resilient member, which is fitted in the slot, is matched; in a preferred embodiment, a lip is formed at the base of the slot, the lip having a rounded end and a concavity directed towards the inside of the wings of the support member: with this arrangement the control tongue can roll around the lip in operation, and its deformation is progressive, which increases its useful life even more.

Preferably, the spine of the resilient member, which joins its wings together, has, in line with its junction with the wing which is configured as a control tongue, a widened zone which is adapted to come into abutment on the control abutment of the support member.

Preferably, the axially acting clutch engaging means consist of a diaphragm.

In a preferred embodiment, the primary abutment means consist of a circumferential press-formed element, continuous or fragmented, formed in the base portion of the cover plate.

Preferably, the ratchet wheel is controlled by the diaphragm through the control tongue; the ratchet wheel is controlled by an actuator consisting of an appendix of the diaphragm at its outer periphery; two lugs are provided, and are spaced circumferentially apart by a passage for the actuator.

Preferably, the ramp means consist of an annular ring having, on one axial side, the inclined ramps which are spaced apart circumferentially, and on the other axial side, the secondary abutment means.

Preferably, the counter ramp means consist of pads adapted to cooperate with the ramps of the ramp means.

Preferably, the worm is mounted for displacement along its axis when subjected to the action of a so-called resilient take-up means.

For a better understanding of the subject matter of the invention, embodiments shown in the attached drawings will now be described, by way of purely illustrative and non-limiting example.

Figure 1:
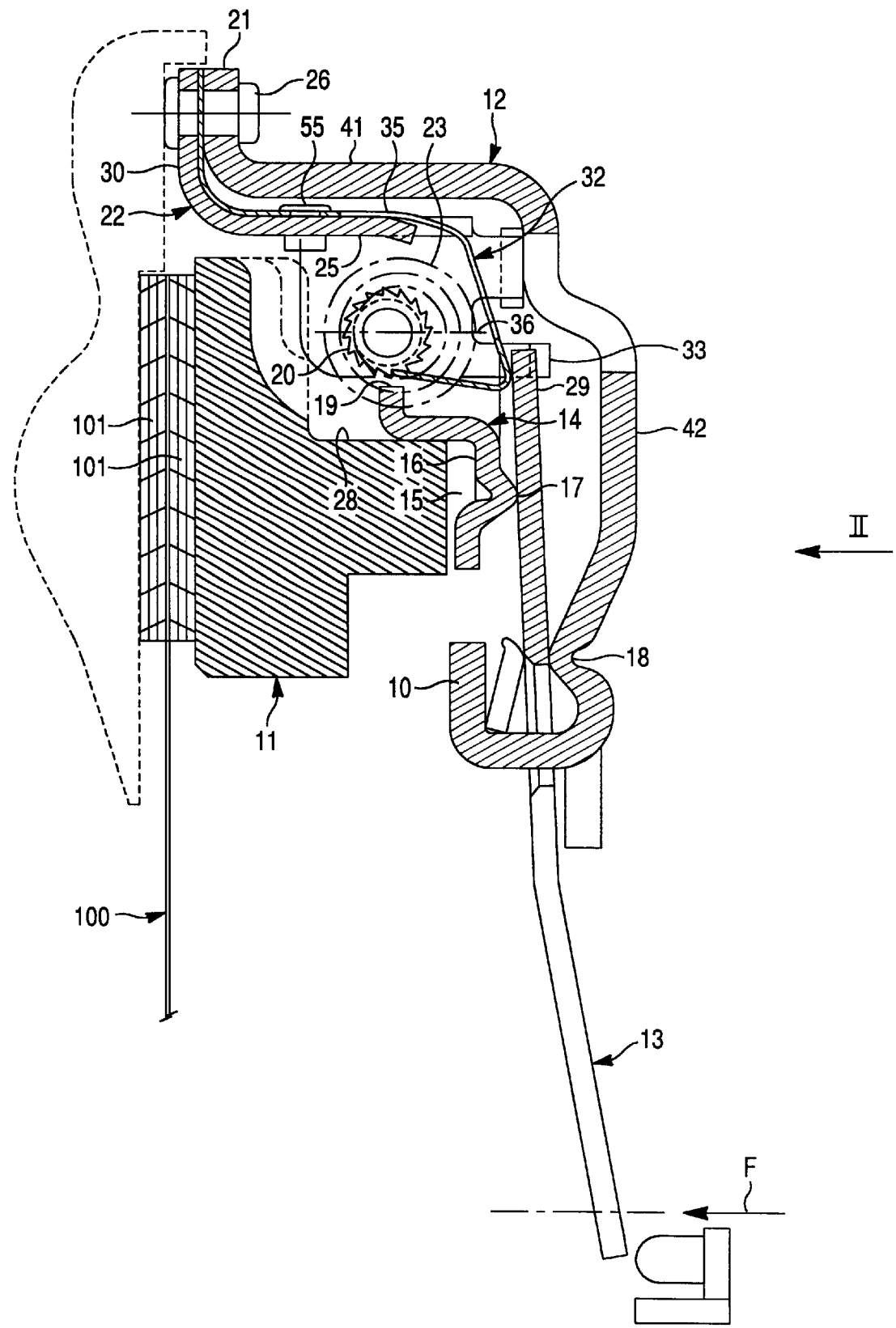
FIG. 1 is a view in cross section of part of a clutch according to the invention equipped with a wear compensating device.

With reference to FIGS. 1 to 4, these show a friction clutch mechanism, especially for a motor vehicle, which includes a pressure plate 11 adapted to cooperate with a friction disc 100, shown diagrammatically in FIG. 1 and consisting of a support plate or disc which in this example carries friction liners 101 at its outer periphery, and which itself cooperates with a reaction plate. The reaction plate, not shown, is part of an engine flywheel which is arranged to be mounted in rotation on a driving shaft such as the crankshaft of the internal combustion engine. The friction disc 100 is fixed to the driven shaft for rotation with the latter, such as the input shaft of the gearbox, through an interposed hub which is carried by the support plate at its inner periphery.

The pressure plate 11 is made of mouldable material and is a casting in this example, and it is fixed to a hollow cover plate 12 for rotation with the latter, in a known way by means of tangential tongues not shown, which are axial in the elastic direction and which at the same time constitute return means biasing the pressure plate 11 towards the hollow cover plate 12, which is press-formed in metal plate. The cover plate 12 in this example is in the form of a hollow dish and includes a base portion 42 which is oriented generally transversely and which is joined through an axially oriented annular skirt portion 41 to a radial flange for fastening to the reaction plate. This flange, 21, is divided into axially offset sections.

The pressure plate 11, while being fixed to the cover plate 12 for rotation with the latter, is accordingly displaceable axially with respect to the cover plate 12 under the biasing action of controlled axially acting resilient means, which in this example consist of a diaphragm 13 articulated on the cover plate 12 by means of lugs 10 projecting from the inner periphery of the base portion 42 of the cover plate 12, together with press-formed elements 18 in the form of circular arcs formed in the base portion 42 of the cover plate 12 and offering a primary abutment to the diaphragm 13, the clutch being in this example of the push-to-release type in which the declutching operation is carried out by acting on the ends of the fingers of the diaphragm 13 in the direction of the arrow F in FIG. 1, in which the clutch is shown engaged. More precisely, the lugs 10 in this example bear on a ring crown, not given a reference numeral, in such a way that the diaphragm 13 is articulated between the primary abutment 18 and the outer periphery of the ring crown, so that the diaphragm can be clamped elastically against the primary abutment 18.

In order, when the clutch is engaged, to maintain the axially acting resilient means 13 in a position independent of wear in the liners 101 of the friction disc 100, and to a lesser extent wear in the pressure plate 11 and reaction plate, the so-called friction faces of which become worn in contact with the liners 101 of the disc 100, a wear compensating device is provided which comprises ramp means 14 having ramps 16 disposed circumferentially; more precisely, these ramp means 14 consist of an annular ring having ramps 16 disposed circumferentially on its face that faces towards the pressure plate 11; on its opposite face the said annular ring has a so-called secondary abutment zone 17 consisting of a rounded upper edge disposed on an arc of a circle centred on the axis of the clutch. The said secondary abutment zone 17 can of course be either continuous or discontinuous. This abutment is located radially outside the primary abutment 18.

The pressure plate 11 has, on its face that faces towards the base portion 42 of the cover plate 12, a transverse engagement face carrying counter ramp means which include counter ramps 15, which in this example are in the form of pads, spaced apart circumferentially from each other by a distance that corresponds to the distance which circumferentially separates two successive ramps 16, and each counter ramp 15 is arranged to cooperate with one ramp 16.

The ramp means 14 are located axially between the diaphragm 13 and the counter ramp means, so that the counter ramps 15 receive the ramps 16 and the diaphragm 13 cooperates with the secondary abutment zone 17, which thus constitutes the abutment means through which the diaphragm 16 acts on the pressure plate 11.

The outer periphery of the ramp means 14 is formed with a set of integral teeth 19. In this example the set of teeth 19 is press-formed in one edge of a component of metal plate formed by stamping and bending and constituting the ramp means 14. The engagement face of the pressure plate 11 in which the pads 15 are formed has a circumferential cylindrical edge 28, on the outer periphery of which the ramp means 14 are centred, the latter having for this purpose an axially oriented annular flange which on the one hand is in intimate contact with the edge 28, and on the other hand joins the set of teeth is 19 to the ramps 14, and in this example the whole is part of an annular ring press-formed metal plate.

The wear compensating device also includes a ratchet wheel 20 with ramp teeth, which is mounted for rotation about a spindle 27 which also carries a worm 23; the thread and the pitch of the worm 23 are matched to the set of teeth 19 of the ramp means 14; the worm 23 is arranged to cooperate with the set of teeth 19 under the conditions which will be described later herein.

Figure 5:
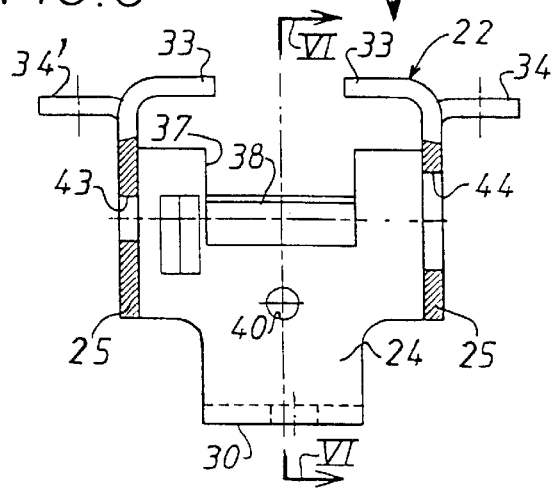
FIGS. 5 to 7 show the support member by itself, FIG. 5 being a view in cross section taken on the line VI—VI in FIG. 5, and FIG. 7 being a view in the direction of the arrow VII in FIG. 5.
Figure 6:
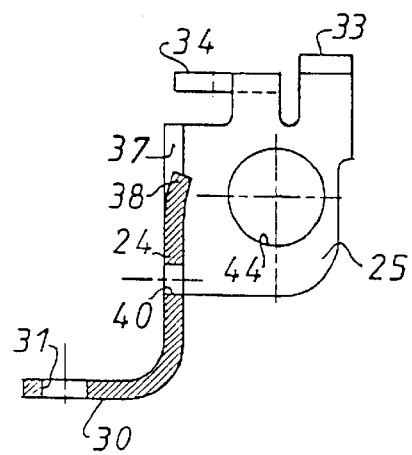
Figure 7:
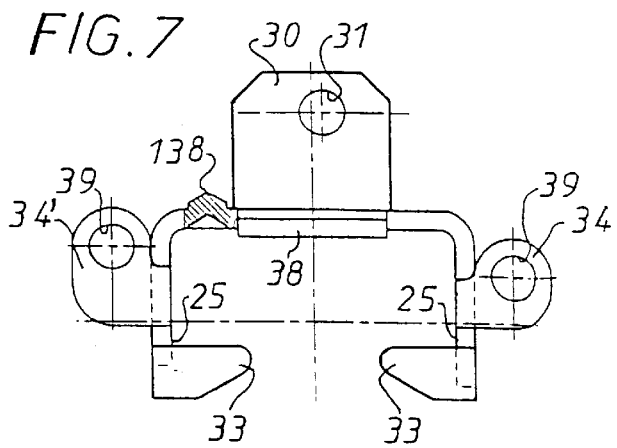

The spindle 27 is carried in rotation by a support member 22 of press-formed and bent sheet metal, which is generally U-shaped with a spine 24 and two wings 25 arranged to support the spindle 27. The support member 22, which is best seen in FIGS. 5 to 7, is fixed to the cover plate 12 by means of its spine 24 and wings 25; more precisely, the spine 24 has a hole 40 and is extended beyond the wings 24, to have a transverse flange 30 extending generally at right angles to the spine 24 and wings 25, and formed with a hole 31; on the side opposite this extension, the edge of the spine 24 is cut out in the centre by a slot 37, at the base of which is formed a lip with a rounded end and a concavity facing towards the interior of the wings 25.

The edge of each wing 25, located on the same side as the slot 37, is cut out in such a way as to form two lugs, namely a so-called abutment lug 33 and a so-called fastening lug 34 and 34' respectively, having a hole 39; the two fastening lugs 34, 34' extend towards the outside of the wings 25, and the two abutment lugs 33 extend inwards; the two fastening lugs 34, 34' lie in a plane which is generally at right angles to the spine 24 and wings 25; the same is true of the two abutment lugs 33; in this example, the plane of the latter is offset outwards from the plane of the fastening lugs 34, 34'.

Each of the wings 25 is formed with a hole 43 and 44 respectively, the hole 44 having a larger diameter than the hole 43.

Figure 8:
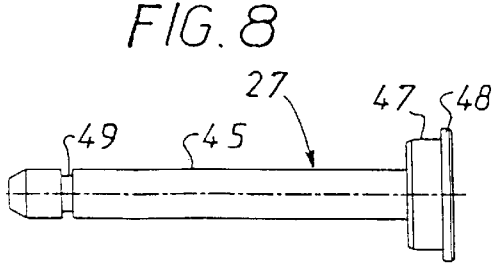
FIG. 8 is a view of the pivot pin by itself.

The spindle 27, which is shown by itself in FIG. 8, comprises a cylindrical body 45 having a cylindrical head of enlarged diameter at one of its ends, the head being itself bounded by a cylindrical flange 48 of an even larger diameter.

The body 45 has a groove 49 in the region of its end opposite the end that carries the head 47.

The hole 44 in one wing 25 of the support member 22 is adapted to receive the head 47, and the hole 43 in the other wing 25 receives the body 45 of the spindle 27. When the spindle 27 is mounted on the support member 22, FIG. 3, the flange 48 is adapted to cooperate with the outer face of the corresponding wing 25, the diameter of the flange 48 being greater than that of the hole 44; the body 45 then extends beyond the other wing 25 and its groove 49, which is adapted to receive a circlip 50 or stop ring; thus, the spindle 25 is held axially in both directions with respect to the support member 22 by the circlip 50 and the flange 48.

Figure 9:
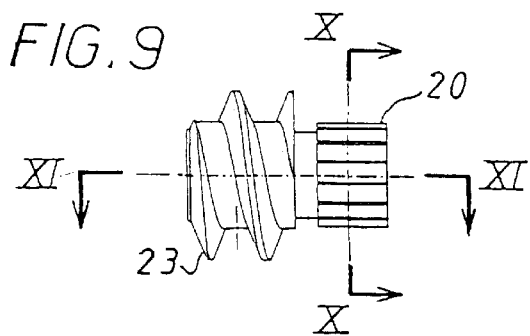
FIGS. 9 to 11 show the worm and ratchet wheel as a one-piece component, FIG. 9 being a view in elevation and FIGS. 10 and 11 cross sections taken on the lines X—X and XI—XI respectively in FIG. 9.
Figure 10:
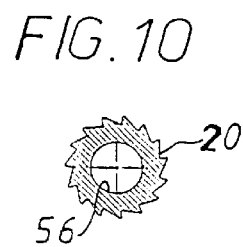
Figure 11:
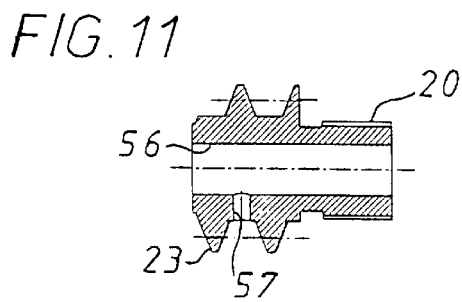

The worm 23 and the ratchet wheel 20 in this example are integral with each other, FIGS. 9 to 11; an axial cylindrical bore 56 enables this component to be mounted on the spindle 27; a transverse hole 57 in line with the worm 23 provides an index mark for the latter and facilitates its initial positioning, the worm 23 and the ratchet wheel 20 could of course be made as separate components and be provided with a bore, the said bore and the spindle 27 itself being arranged in such a way that the worm 23 and the ratchet wheel 20 are able to slide along the spindle 27 while being fixed to the said spindle 27 for rotation with it. In another version, one of these two components 20 or 23 is integral with the spindle 27.

Figure 3:
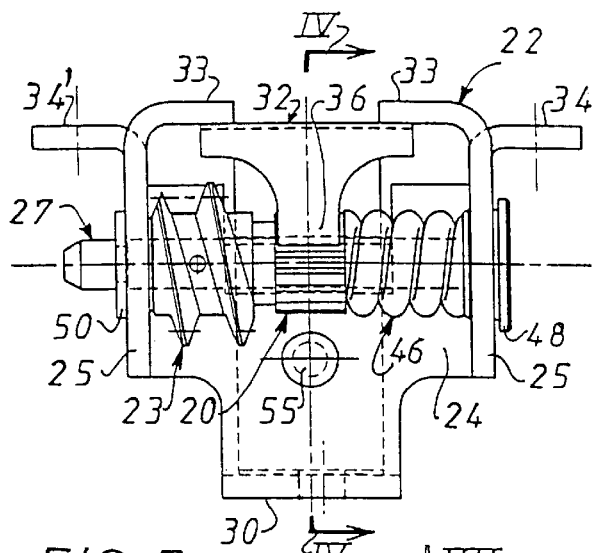
FIG. 3 is a front view of the sub-assembly consisting of the support member and the components carried by it.
Figure 4:
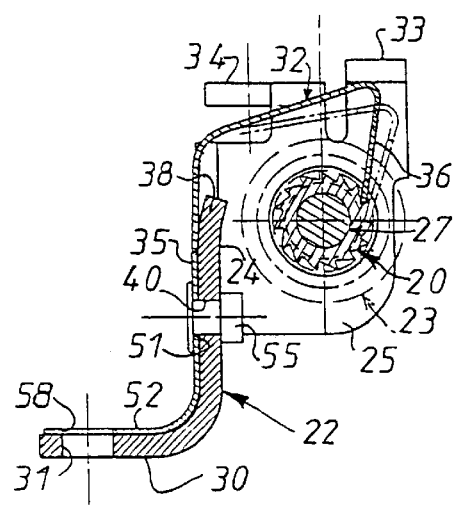
FIG. 4 is a view in cross section taken on the line IV—IV in FIG. 3.
Figure 12:
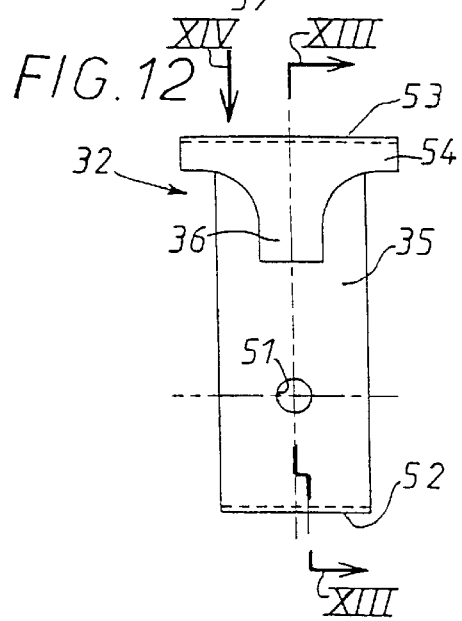
FIGS. 12 to 14 show the resilient member by itself, FIG. 12 being a view in elevation, FIG. 13 a view in cross section taken on the line XIII—XIII in FIG. 12, and FIG. 14 being a view in the direction of the arrow XIV in FIG. 12.
Figure 13:
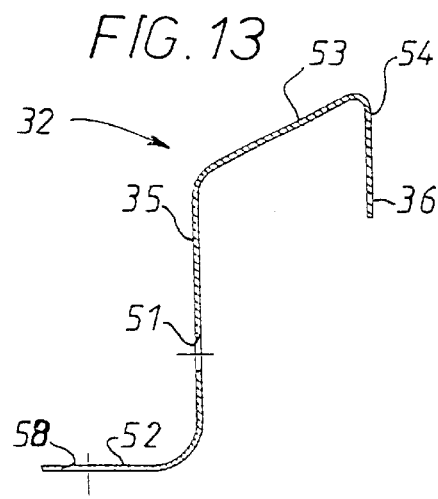
Figure 14:
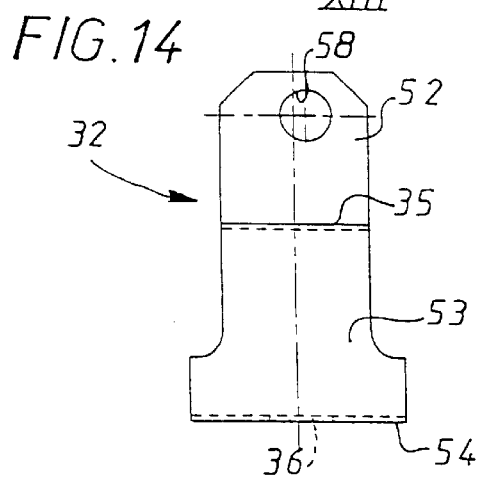

A resilient member 32, which in this example is of metal and is thinner than the support member, being generally U-shaped in axial cross section, includes two axially oriented wings 35, 36, in which one wing 35, which is formed with a hole 51 for fastening it and is extended by a generally perpendicular tongue 52 which extends outwards from the U and is formed with a hole 58 for fastening it, in this example by means of a rivet 26 which secures the support member 22, on a transverse flange 21 of the cover plate 12 which borders its skirt 41 and is generally parallel to its base portion 42, the hole 58 and the tongue 52 corresponding to the hole 31 in the flange 30 of the spine 24 of the support member 22; the other wing 36 of the resilient member 32 is configured as a control tongue and in this example it extends generally parallel to the axis of the clutch; as is seen best in FIGS. 12 to 14 which show the resilient member 32 alone, the end of the control tongue 36 is of reduced width, its width being generally matched to that of the teeth of the ratchet wheel 20; the relevant width of the resilient member 32 is matched to the width of the slot 37 of the support member 22 in which it is fitted; the spine 53 of the U of the resilient member 32, which joins its wings 35 and 36 together, has, in line with its junction with the wing 36 or control tongue, a widened zone 54 which is adapted to make elastic engagement on the lugs 33, or control abutment, of the support member 22, as can be seen in FIGS. 3 and 4; when the resilient member 32 and the ratchet wheel 20 are mounted on the cover plate 12, the control tongue 36 is in elastic cooperation with a tooth root of the ratchet wheel 20.

A helical compression spring is placed around the spindle 27 and constitutes the resilient take-up means, as will be described below. In this example, the spring 46 is placed axially between the ratchet wheel 20 and one wing 25 of the support member 22.

It will be appreciated that the support member 22, equipped with the worm 23, the ratchet wheel 20, the spring 46, the spindle 27 and the resilient member 22 constitute a sub-assembly ready to be fitted on the cover plate 12 of the clutch. Such a sub-assembly is shown in FIGS. 3 and 4; the form of the resilient member 32 described above enables its fastening wing 35 and tongue 52 to be laid flat on the outer faces of the spine 24 and flange 30 of the latter, the hole 40 in the support member 22 and the hole 51 in the resilient member 32 being in register with each other; this enables the resilient member 32 to be fixed on the support member 22, in this example by means of a rivet 55. In another version, this fastening is obtained by clipping. Due to the lip 38, with its concavity facing towards the interior of the wings 25 of the support member 22, the resilient member 32 can be displaced elastically without damage under the conditions to be explained later herein, with its control tongue 36 being of substantial length.

Figure 2:
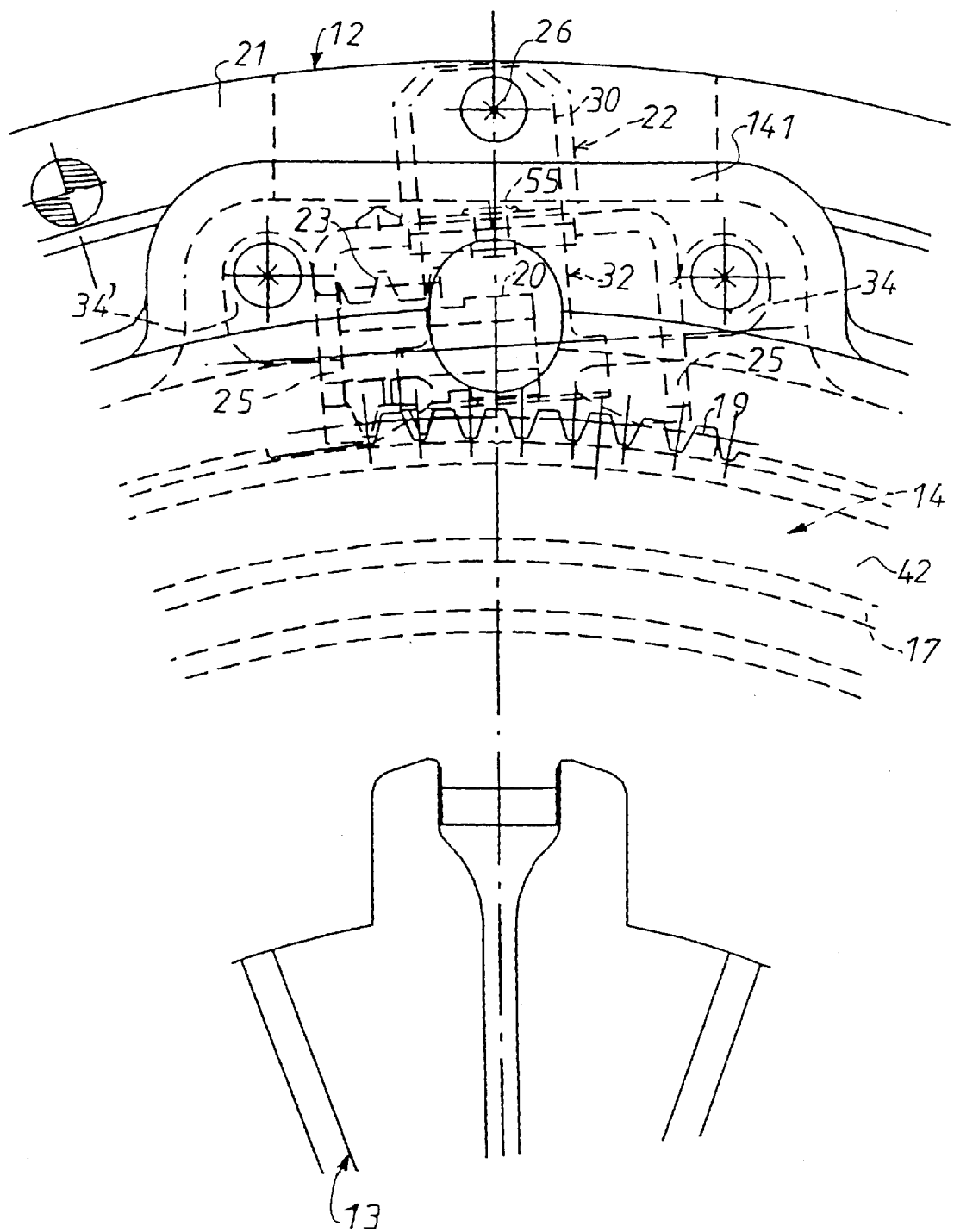
FIG. 2 is a view of the clutch, partly cut away, as seen in the direction of the arrow 11 in FIG. 1.

Since the support member 22, carrying the ratchet wheel 20, worm 23 and helical spring 46, is fixed to the cover plate 12, the diaphragm 13 is displaced with respect to it and therefore with respect to the control tongue 36, during the operations of disengaging and re-engaging the clutch; the diaphragm 13 carries at its periphery a radial appendix called an actuator 29, FIGS. 1 and 2, which extends radially on the outside of the Belleville ring portion of the diaphragm 13, so as to cooperate with the control tongue 36 of the resilient member 32; it will be understood that by virtue of this arrangement, during tilting of the diaphragm 13 in the course of operations of re-engaging the clutch, the diaphragm displaces the control tongue 36 from right to left with reference to FIG. 1, and, by cooperation with the teeth of the ratchet wheel 20, the end of the control tongue 36 is caused to turn the ratchet wheel 20 in the clockwise direction; during the declutching operation, the elasticity of the resilient member 32 and the inclination of the teeth of the ratchet wheel 20 cause the control tongue 36 to mount on the teeth of the latter.

The wear compensating device which has just been described works in the following way.

FIG. 1 shows diagrammatically the clutch in its engaged condition, the liners 101 of the friction disc 100 being new and being gripped between the reaction plate, not shown, and the pressure plate 11. In this position, the control tongue 36 has its end at the root of a tooth of the ratchet wheel 20. When the clutch is disengaged, the ends of the fingers of the diaphragm 13 are urged in the direction of the arrow F, away from the base portion 42 of the cover plate 12; the diaphragm 13 tilts about the primary abutment 18 under the action of the elastic gripping force exerted by the crown ring; during its displacement, the outer periphery of the diaphragm 13 releases the pressure plate 11 and its actuator 29 releases the control tongue 36, progressively; the end of the control tongue 36 follows the inclined ramp defined by the tooth in the root of which it lay in the preceding step, the teeth of the ratchet wheel 20 being made in such a way that, during the course of this declutching movement with new liners, the end of the control tongue 36 does not jump over a tooth; this happens when the resilient element 32, and therefore its control tongue 36 too, come into abutment against a so-called control abutment 33 of the support member 22; preferably, and as is best seen in FIG. 2, there are two lugs 33 spaced apart circumferentially so as to allow the actuator 29 to pass between them.

As the liners become worn, as is well known, the pressure plate 11 which is always subjected to the axial force exerted by the diaphragm 13, comes closer to the reaction plate, which is fixed axially as is the cover plate 12; the actuator 29 of the diaphragm 13 then goes closer to the reaction plate, driving in its movement the control tongue 36; the ratchet wheel 20 turns about its axis in the clockwise direction; this driving of the ratchet wheel 20 in rotation leads the worm 23 to turn on its axis also; the ramp means 14 are immobilised against rotation by the force exerted by the diaphragm 13, so that the worm 23, which is in mesh with the teeth 19, turns the teeth 19 so as to compress the helical spring 46, the direction of the thread of the worm 23 being determined accordingly.

During the declutching operation which follows the phase of wear which has just been described, the pressure plate 11 releases the liners 101, moving further away from them under the action of the tangential tongues, which urge towards the base portion 42 of the cover plate 12 the pressure plate 11 and the ramp means 14, which are in contact with the diaphragm 13 through their secondary abutment zone 17 and with the pads 15 through their ramps 16. The helical spring 46 urges the worm 23 towards the wing 25 of the support member 22, from which it is spaced away in wear phases, that is to say from right to left with respect to FIG. 3; the load of the diaphragm 13 is no longer applied on the ramp means 14, so that the only force to be overcome in order to be able to turn the ramp means 14 with respect to the pressure plate 11 is the return force of the tangential tongues; if the load of the helical spring 46 is sufficiently large to overcome this force, then the spring 46 displaces the worm 23, which is prevented from turning on itself by the pressure of the control tongue 35, and which will drive the set of teeth 19; by turning on themselves, the ramps 16, by cooperation with the relatively fixed pads 15, will take the pressure plate 11 further away from the base portion 42 of the cover plate 12, thereby increasing the axial distance between the working face of the pressure plate 11 and the secondary abutment zones 17 of the ramp means 14, and so taking up at least some of the displacement of the pressure plate 11 due to wear in the liners 101. Since the load of the helical spring 46 is a function of the amount by which it will have been compressed by the worm 23 during the wear phase, it can be seen that several operations of engaging and disengaging the clutch may be necessary before the wear compensating device enters the take-up phase proper, this being a function of the relative dimensioning of the components concerned.

If wear has been sufficient for the ratchet wheel 20 to have turned enough for the control tongue 36, the return travel of which is limited by the control abutment 33, to jump a tooth on the return, then during the next clutch engaging operation, the control tongue 36 causes the ratchet wheel 20 and the ramp means 14, which are no longer held gripped by the diaphragm 13, to rotate and take up the wear; at the end of the take-up operation, in the clutch engaged condition, the diaphragm 13, the ratchet wheel 20 and the control tongue 36 regain the position which they occupied in FIG. 1.

It is of course possible to replace the lugs and the crown ring by means of short posts with profiled heads offering an abutment in face-to-face relationship with the primary abutment 18.

In another version, the set of teeth 19 is part of a component separate from the ramp means. This intermediate component has at its inner periphery teeth which penetrate into openings formed in the axially oriented annular flange of the ramp means formed beyond the secondary abutment 17. This flange (not given a reference numeral) is in cooperation with the cylindrical edge 28. The set of teeth are thus fixed in relation to the ramp means 14, while being able to be displaced with respect to the latter by virtue of a coupling of the tenon and mortice type.

The intermediate component is of course mounted axially on the cover plate, for example by means of extensions of two axially resilient tongues, which couple the pressure plate 11 in rotation to the cover plate 12 with axial mobility.

In another version, axially elastic tongues couple the intermediate component in rotation to the ramp means.

Thanks to the invention, the resilient member 32 is out of contact with the wings 25 of the support member and are subjected to less stress. The resilient member 32 is fixed to the spine 24 of the support member 22 independently of the fastening of the spine 24 to the cover plate 12.

As can be seen in FIG. 2, the skirt of the cover plate 12 is deformed locally at 141 so as to form a seating of U-shaped cross section with a base having holes for fastening the lugs 34, 34' by riveting to the cover plate 12. The lugs 24, 24' in this example are different, because here, the worm 23 extends tangentially to the set of teeth 19, to give good performance and reduce friction.

Thus, the fastening holes formed in the base of the seating in the cover plate are adapted for fastening of the support member 22 carrying a worm 23 extending tangentially to the set of teeth 19 or to a support member which carries a worm that is not tangential to the set of teeth 19.

In the first case, the lugs 34, 34' are different, while in the second case the lugs are identical.

By modifying the fastening holes mentioned above, the lugs 34 can of course be made identical while having a worm 23 which extends tangentially to the set of teeth 19.

As can be seen in FIGS. 7 and 2, the spine 24 of the cover plate 12 carries a boss 138 which is arranged to cooperate with the spine of the housing in such a way that the support is stable and is hardly sensitive to centrifugal force effects, its boss 138 then making contact with the spine of the seating 141.

It is of course possible to reverse the structures, with the boss then coming from the spine of the seating 141. The inclination of the support is then well guaranteed.

What is claimed is:

1. A friction clutch comprising a reaction plate adapted to be mounted in rotation on a driving shaft, a friction disc (100) carrying at its outer periphery at least one friction liner (101) and adapted to be mounted in rotation on a driven shaft, a pressure plate (11), a cover plate (12) fixed on the reaction plate, axially acting clutch engaging means (13) which are controlled by declutching means and which work between the cover plate (12) on the one hand and the pressure plate (11) on the other hand, through secondary abutment means (17) and primary abutment means (18), the pressure plate (11) being fixed in rotation to the cover plate (12) while being displaceable axially with respect to the cover plate (12) and being subjected to a resilient action urging the pressure plate (11) axially towards the cover plate (12), said clutch further including a wear compensating device comprising ramp means (14), the ramps (16) of which are disposed circumferentially and which is placed axially between the abutment means (17) and the pressure plate (11) and adapted to cooperate with counter-ramp means (15), a set of teeth (19) with which a worm (23), disposed tangentially, is in cooperation, the ramp means (14) being fixed in rotation to said set of teeth (19), means (20) being provided for driving the worm (23) in rotation and being operated as a result of wear in the friction liner or liners (101) when the clutch is engaged, said worm driving means consisting of a ratchet wheel which is fixed in rotation to the worm (23) and controlled through a control tongue (36) which is part of a resilient member (32), the worm (23) and the ratchet wheel (20) being carried by a support member (22), the support member (22) and the resilient member (32) being fixed to the cover plate (12) and being placed inside the latter, the support member (22) being U-shaped with a spine (24) and two wings (25) which are adapted to support a spindle (27) carrying the worm (23) and the ratchet wheel (20), wherein the resilient member (32) is fixed (55) to the spine (24) of the support member (22) independently of the fastening of the support member to the cover plate.

2. A friction clutch according to claim 1, wherein the resilient member (32) is disposed at least partly in the zone in which the resilient member (32) is fixed to the support member (22), between the spine (24) of the support member (22) and the cover plate (12).

3. A friction clutch according to claim 2, wherein the resilient member (32) is generally U-shaped in axial cross section and comprises two axially oriented wings (35, 36), one of which (35) is formed with a hole (51) for fastening it to the support member (22), the other one (36) being configured as a control tongue and extending generally parallel to the axis of the clutch.

4. A friction clutch according to claim 3, wherein the spine (24) of the support member (22) is extended, beyond the wings (25), by a transverse flange (30) extending generally at right angles to the spine (24) and wings (25), while the wing (35) of the resilient member (32), fastening the latter to the support member (22), is extended by a generally perpendicular tongue (52) which extends outwards from the U-shaped resilient member (32), and, with the flange (30) of the support member(22), lies against a transverse flange (21) of the cover plate (12).

5. A friction clutch according to claim 2, wherein the course of travel of the control tongue (36) with respect to the ratchet wheel (20), during the operation of disengaging the clutch, is limited by a control abutment (33) defined by at least one lug formed by being pressed out in the support member (22).

6. A friction clutch according to claim 5, wherein the edge of the spine (24) of the support member (22) is cut out in the center as a slot (37) having a width with which the corresponding width of the resilient member (32), which is fitted in the slot (37), is matched.

7. A friction clutch according to claim 6, wherein a lip (38) is formed at the base of the slot (37), the lip having a rounded end and a concavity directed towards the inside of the wings (25) of the support member (22).

8. A friction clutch according to claim 3, wherein a spine (53) of the resilient member (32), which joins its wings (35, 36) together, has, in line with its junction with the wing (36) which is configured as a control tongue, a widened zone (54) which is adapted to come into abutment on the control abutment (33) of the support member (22).

9. A friction clutch according to claim 5, wherein the axially acting clutch engaging means consist of a diaphragm (13).

10. A friction clutch according to claim 9, wherein the primary abutment means (18) consist of a circumferential press-formed element, continuous or fragmented, formed in the base portion (42) of the cover plate (12).

11. A friction clutch according to claim 9, wherein the ratchet wheel (20) is controlled by the diaphragm (13) through the control tongue (36).

12. A friction clutch according to claim 11, wherein the ratchet wheel (20) is controlled by an actuator (29) consisting of an appendix of the diaphragm (13) at its outer periphery.

13. A friction clutch according to claim 12, wherein two lugs (33) are provided, and are spaced circumferentially apart by a passage for the actuator (29).

14. A friction clutch according to claim 1, wherein the ramp means (14) consist of an annular ring having, on one axial side, the inclined ramps (16) which are spaced apart circumferentially, and on the other axial side, the secondary abutment means (17).

15. A friction clutch according to claim 1, wherein the counter ramp means (15) consist of pads adapted to cooperate with the ramps (16) of the ramp means (14).

16. A friction clutch according to claim 1, wherein the worm (23) is mounted for displacement along its axis when subjected to the action of a resilient take-up means (46).

* * * * *